United States Patent [19]

Abbott et al.

[11] Patent Number: 5,050,081
[45] Date of Patent: Sep. 17, 1991

[54] METHOD AND SYSTEM FOR MONITORING AND DISPLAYING ENGINE PERFORMANCE PARAMETERS

[75] Inventors: Terence S. Abbott, Williamsburg; Lee H. Person, Jr., Yorktown, both of Va.

[73] Assignee: The United States of America as represented by the Administrator of the National Aeronautics and Space Adminstration, Washington, D.C.

[21] Appl. No.: 270,189

[22] Filed: Nov. 14, 1988

[51] Int. Cl.[5] .............................................. G06F 15/50
[52] U.S. Cl. ........................... 364/424.06; 364/431.07
[58] Field of Search ..................... 364/424.03, 424.06, 364/433, 434, 431.04, 431.06, 431.07, 427, 428; 340/964, 971, 973, 959

[56] References Cited

U.S. PATENT DOCUMENTS

| | | | |
|---|---|---|---|
| 4,212,064 | 7/1980 | Forsythe et al. | 364/424.03 |
| 4,247,843 | 1/1981 | Miller et al. | 340/973 |
| 4,325,123 | 4/1982 | Graham et al. | 364/442 |
| 4,471,439 | 9/1984 | Robbins et al. | 364/433 |
| 4,507,657 | 3/1985 | Bates | 340/959 |
| 4,626,851 | 12/1986 | Tooze | 340/973 |
| 4,843,554 | 6/1989 | Middleton et al. | 364/427 |

Primary Examiner—Parshotam S. Lall
Assistant Examiner—Tyrone Queen
Attorney, Agent, or Firm—Harold W. Adams

[57] ABSTRACT

The invention is a method and system for monitoring and directly displaying the actual thrust produced by a jet aircraft engine under determined operating conditions and the available thrust and predicted (commanded) thrust of a functional model of an ideal engine under the same determined operating conditions. A first set of actual value output signals representative of a plurality of actual performance parameters of the engine under the determined operating conditions is generated and compared with a second set of predicted value output signals representative of the predicted value of corresponding performance parameters of a functional model of the engine under the determined operating conditions to produce a third set of difference value output signals within a range of normal, caution, or warning limit values. A thrust indicator displays when any one of the actual value output signals is in the warning range while shaping function means shape each of the respective difference output signals as each approaches the limit of the respective normal, caution, and warning range limits.

27 Claims, 3 Drawing Sheets

METHOD AND SYSTEM FOR MONITORING AND DISPLAYING ENGINE PERFORMANCE PARAMETERS

ORIGIN OF INVENTION

The invention described herein was made by employees of the U.S. Government and may be manufactured and used by or for the Government for governmental purposes without the payment of any royalties thereon or therefor.

BACKGROUND OF THE INVENTION

1. Field of the Invention

The invention is a method and system for monitoring and displaying engine performance parameters and more particularly to a method and system for simultaneously monitoring and visually displaying, a plurality of the performance parameters of an aircraft engine during operation, including the predicted value of maximum available thrust or power, the predicated amount of thrust commanded, and the thrust then actually being produced within the critical limits of the predicted nominal and actual values of the plurality of monitored engine performance parameters.

2. Description of the Prior Art

In general conventional single and multiple engine aircraft control systems include individual instruments that provide operational data (engine performance parameter measurements) to the pilot based on the outputs of a plurality of individual sensors.

Some electronically generated, microprocessor driven displays in multiple engine jet aircraft, such as the Boeing 757/767 manufactured by Boeing Commercial Airplane Company, P.0. Box 3707, Seattle, Wash. 98124, use a similar approach, except the outputs from two or more sensors may be presented on a single electronic display.

Thus, conventional instrumentation can result in a cluttered control panel that increases the pilots workload in reading and interpreting the outputs of the various instruments. This in turn adds to the difficulty of readily and accurately identifying changes in critical and changing engine performance parameters that can lead to degrading off-nominal or off-limit operating conditions.

For instance, currently, before making a thrust or power adjustment during take off, pilots of multiple engine jet aircraft use charts to calculate the amount of thrust available from each engine and then using this reading to set either the engine pressure ratio (EPR) or low pressure compression rotational speed for each engine. In addition, the pilot must also cross-check the several engine performance parameters for each engine such as exhaust gas temperature (EGT), fuel flow (FF), oil pressure, temperature, and quantity to assure all are within the operational limits of each engine as provided by the manufacturer or based on the pilots experience and judgement before changing the thrust of the engines. This is an indirect, time consuming thrust control process.

SUMMARY OF THE INVENTION

An object of the invention is to provide a method and system for monitoring and displaying aircraft engine performance parameters permitting a pilot to make direct operational changes in thrust or power based solely on engine performance parameter that are simultaneously monitored and displayed.

A further object of the invention is to provide a method and system for monitoring and displaying aircraft engine performance parameters such as available thrust, the predicted amount of thrust commanded, and the actual amount of thrust being produced within the critical limits of predicted normal and actual engine performance parameters.

A further object of the invention is to provide a method and system for directly displaying the difference between predicted and actual performance parameters of a jet aircraft engine that are within determined limits, of a range of values.

Another object of the invention is to provide a method and system for simultaneously displaying the differences between the predicted and actual values of a plurality of engine performance parameters for one or more jet aircraft engines in a single display, the actual values being displayed in a first format and the difference values being displayed in a second format indicative of determined limits of said difference values.

Still another object of the invention is to provide a monitoring and display system and method in which difference signals are shaped as their values approach the limit of one or more ranges of limit values.

BRIEF DESCRIPTION OF THE DRAWINGS

The above and numerous other objects of the invention will become apparent from the following description when read in light of the appended drawings wherein.

BRIEF DESCRIPTION OF THE INVENTION

Figure 1:
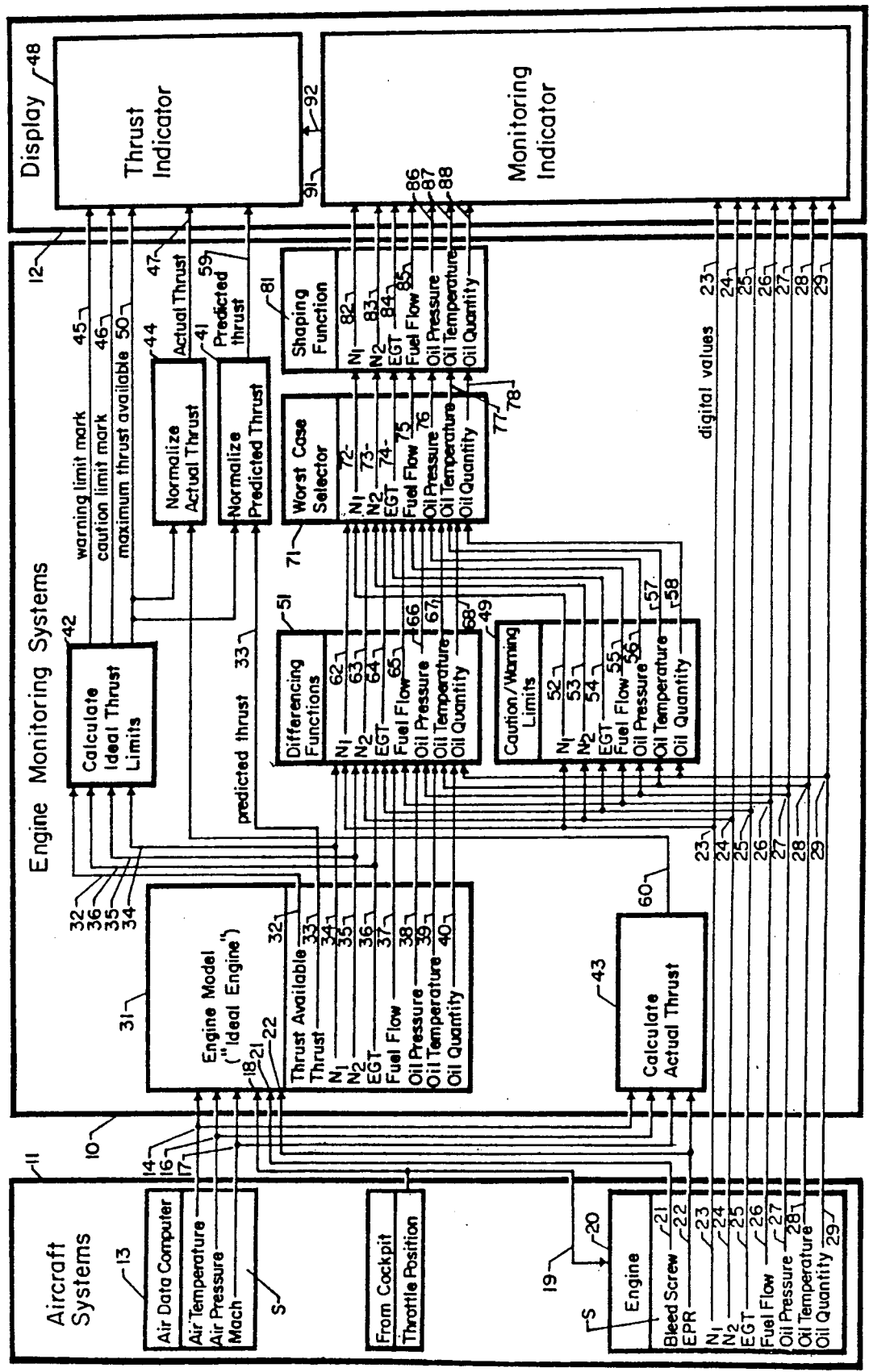
FIG. 1 schematically illustrates a preferred embodiment of a monitoring and display system in accordance with the invention.

Referring to the drawings, FIG. 1 illustrates a preferred embodiment of the invention for use in single or multiple engine jet aircraft as generally comprising an engine monitoring system section 10 interconnected between an aircraft system section 11 and a display section 12.

Aircraft system section 11 includes a commercially available air data computer 13, such as a model number A.320 ADIRS air data computer manufactured by Honeywell responsive to conventional jet aircraft sensors S mounted and arranged to provide digital output signals 14, 16, and 17, representative respectively of the operating conditions of external air temperature, air pressure, and the mach or airspeed of the aircraft as a percentage of the speed of sound at ground level.

Aircraft system section 11 also provides parallel digital output signals 18 and 19 representative of the aircrafts throttle position as controlled by a pilot, the output signal 18 being directly connected to control for example a respective jet engine 20 such as a model JT8D-7 jet engine manufactured by Pratt and Whitney, (address). Conventional aircraft system sensors S' responsive to the operation of the jet engine 20 provide a first group of digital output signals representative of the position of bleed valve 21 and the engine gas pressure ratio 22, and a first set of digital output signals representative of $N_1$ (low pressure compressor rotational speed) 23, $N_2$ (high pressure compressor rotational speed) 24, exhaust gas temperature 25, fuel flow 26, oil pressure 27, oil temperature 28, and oil quantity 29.

The digital output signals 14, 16, 17, 18, and 21, are representative of the determined operating conditions of the jet engine 20 and are connected to the engine monitoring section 10 which includes a suitable and commercially available microprocessor in a subsection 31 arranged to store in memory the identical engine performance parameters of an ideal functional model of the engine 20 and to calculate or predict the available thrust output 32 and predicted (commanded) thrust 33 of the ideal functional model engine 20 based on the output signals 14, 16, 17, 18, and 21 of the engine 20. Thus, the predicted thrust that the engine 20 should produce, output signal 33 of subsection 31, is based on the actual operating conditions of engine 20 as represented by output signals 14, 16, 17, 18, and 21. Subsection 31 also generates a second set of digital output signals 34-40 which represent the predicted values for an ideal functional model of engine 20 and which correspond to digital output signals 23-29 respectively. Output signals 32 and 33 and the second set of output signals 34-40 form a second group of output signals.

For example an engine indication and crew alerting system (EICAS) manufactured by the Collins Air Transport Division, Rockwell International Corporation, Cedar Rapids, Iowa 52498 may be programmed to provide the engine model subsection 31, which includes subsections 42 and 43 for calculating the ideal thrust limits and actual thrust respectively, and subsection 41 and 44 for normalizing the predicted and actual thrust respectively. Output signals 45, 46, and 50 from subsection 42 and output signal 47 from subsection 44 along with output signal 59 from subsection 41 are connected to a thrust indicator 48 in display section 12.

A caution/warning limits subsection 49 is connected to engine 20 and a differencing function subsection 51. A set of caution/warning limit output signals 52-58 from subsection 49 and a set of difference value output signals 62-68 from subsection 51 are analyzed in a worst case subsection 71, the output signals 72-78 of which are shaped as required in shaping function subsection 81 to generate a third set of difference value output signals 82-88.

The first and third sets of output signals 23-29 and 82-88 are connected to a monitoring indicator 91 in the display section 12. Monitoring indicator 91 generates an output signal 92 connected to thrust indicator 48 when any one of the monitored performance parameters of engine 20 exceeds a determined or off-limit values which condition is also displayed by thrust indicator 48.

Subsection 31 generates output signals 32 and 33 representative of the ideal thrust available and the ideal predicted thrust respectively as well as the second set of predicted digital output signals 34-40 for $N_1$ (ideal low pressure compressor rotational speed), $N_2$ (High pressure compressor rotational speed), the ideal exhaust gas temperature, the ideal fuel flow, ideal oil pressure, ideal oil temperature and ideal oil quantity respectively. As shown in FIG. 1, the "ideal" digital output signals 32, 34, 35, and 36 are used to calculate the thrust limits output signals 45, 46 and 50 of an ideal model of engine 20 based on the actual operating conditions of engine 20 as represented by the output signals 14, 22, 16, 17 and 21.

Thus, subsection 31 calculates and provides digital output signals 32-40 representative of the predicted engine performance parameters of a functional model of an ideal engine when operated under the same operating conditions as engine 20 as indicated by the digital output signals 14, 18, 22, 16, 17, and 21.

A simplified functional model for each of the ideal engine performance parameters represented by the digital output signals 32-40 is used to calculate the ideal thrust limits in subsection 42 as represented by output signals 45, 46, and 50, normalize the actual thrust in subsection 44 to generate output signal 47, normalize the predicted thrust in subsection 41 to generate output signal 59, and perform the differencing function in subsection 51.

To produce the required functional models it is assumed that for any given value of an engine performance parameter, $N_1$ for example, a reasonable approximation of the actual $N_1$ characteristics of the engine 20 can be obtained from: a third-order polynomial equation. To obtain the required coefficients, a set of data is obtained from the engine 20 for a wide range of flight conditions (altitude, mach, temperature, and throttle positions), from either the engine manufacturers data or flight test data. Applying a multiple polynomial regression analysis to this data provides the relevant coefficients.

Rejecting unnecessary terms, this regression serves to reduce the complexity of the final functional model. For instance, when this analysis is applied to a model JT8D-7 jet engine made by Pratt and Whitney Aircraft Group, 400 Main Street, Commercial Products Division, East Hartford, Conn. 06108, the functional model for the ideal engine performance parameter is of the following form:

$$N_l = a_0 + a_1 X^3 + a_2 Y^3 + a_3 Z^3 + a_4 X^2 Y + a_5 Y^2 Z + a_6 YZ^2 + a_7 Y + a_8 XZ + a_9 XYZ.$$

Where X is EPR, Y is mach, Z is altitude, and $a_0$---$a_9$ are the coefficients. Additionally, a standard atmospheric model was assumed. This means that altitude has temperature effect included. For a non-standard atmosphere, altitude and temperature would be two separate input variables instead of one. In practice, two $N_1$ models may be used, one for the bleed-valve, normally closed condition signal 21 or a bleed-valve open condition signal 21−0. A partially open bleed-valve condition signal may also be provided.

For example, with bleed-valve 21 closed, assume the predicted thrust of an ideal engine such as a model JT8D-7 jet engine is to be computed using the following inputs:

Output signal 18 = Throttle = 50.35 degrees
Output signal 22 = EPR = 1.855
Output signal 16 = Xalt = 0, where Xalt = altitude/1000
Output signal 17 = Mach = 0
Output signal 21 = BVOpen = Closed Then, THRUST AVAILABLE = $13690.30 + 0.1033 \cdot \text{Xalt}^3 - 7.4648 \cdot \text{Xalt}^2 \cdot \text{Mach} - 35.1743 \cdot \text{Xalt} \cdot \text{Mach}^2 + 299.6407 \cdot \text{Xalt} \cdot \text{Mach} - 360.9475 \cdot \text{Xalt} + 2745.6020 \cdot \text{Mach}^3 + 57.9160 \cdot \text{Mach}^2 - 5346.7260 \cdot \text{Mach} = 13960$ -continued $$\text{THRUST} = 665.083 - 0.665606 \cdot \text{Throttle}^3 - 138.613 \cdot \text{Mach}^3 +$$
$$0.00164722 \cdot \text{Xalt}^3 + 20.1489 \cdot \text{Throttle}^2 + 1821.64 \cdot \text{Mach}^2 -$$
$$0.287707 \cdot \text{Xalt}^2 - 31.4498 \cdot \text{Throttle}^2 \cdot \text{Mach} + 0.371256 \cdot$$
$$\text{Throttle}^2 \cdot \text{Xalt} + 160.428 \cdot \text{Mach}^2 \cdot \text{Throttle} - 76.8132 \cdot \text{Mach}^2 \cdot$$
$$\text{Xalt} + 0.0827116 \cdot \text{Xalt}^2 \cdot \text{Throttle} + 0.188178 \cdot \text{Xalt}^2 \cdot \text{Mach} -$$
$$43.7439 \cdot \text{Throttle} - 6573.05 \cdot \text{Mach} + 30.9052 \cdot \text{Xalt} + 760.728 \cdot$$
$$\text{Throttle} \cdot \text{Mach} - 12.3659 \cdot \text{Throttle} \cdot \text{Xalt} + 127.065 \cdot \text{Mach} \cdot$$
$$\text{Xalt} - 7.97973 \cdot \text{Throttle} \cdot \text{Mach} \cdot \text{Xalt} = 13680$$

When normalized (13680/13960) it is 98%

$$\text{FUEL F} = -5585.67700 + 186.4989 \text{ Y.H EPR}^3 + 307.2636 \cdot$$
$$\text{Mach}^3 + 2999.2980 \cdot \text{Mach}^2 \cdot \text{EPR} - 113.7397 \cdot \text{Mach}^2 \cdot \text{Xalt} +$$
$$1.8745 \cdot \text{Xalt}^2 \cdot \text{EPR} + 6165.1390 \cdot \text{EPR} - 62.2521 \cdot \text{Mach} +$$
$$225.2723 \cdot \text{Xalt} - 271.1962 \cdot \text{EPR} \cdot \text{Xalt} -$$
$$12.6817 \cdot \text{Mach} \cdot \text{Xalt} = 6976$$

$$N_1 = -9.87903 - 2.23979 \cdot \text{EPR}^3 - 4.94002 \cdot \text{EPR}^2 \cdot \text{Mach} +$$
$$0.10144 \cdot \text{EPR}^2 \cdot \text{Xalt} + 0.81913 \cdot \text{Mach}^2 \cdot \text{EPR} - 0.92738\text{E-}03 \cdot$$
$$\text{Xalt}^2 \cdot \text{Mach} + 61.24552 \cdot \text{EPR} + 24.80411 \cdot \text{Mach} - 0.35347 \cdot$$
$$\text{EPR} \cdot \text{Xalt} + 0.01570 \cdot \text{EPR} \cdot \text{Mach} \cdot \text{Xalt} = 89.78$$

$$N_2 = 35.89122 - 1.89779 \cdot \text{EPR}^3 - 0.70771\text{E-}05 \text{ Y.H Xalt}^3 +$$
$$13.73388 \cdot \text{Mach}^2 + 0.11628 \cdot \text{EPR}^2 \cdot \text{Xalt} - 4.78871 \cdot \text{Mach}^2 \cdot$$
$$\text{EPR} + 36.39701 \cdot \text{EPR} + 3.84387 \cdot \text{Mach} - 0.37757 \cdot \text{EPR} \cdot$$
$$\text{Xalt} - 0.02129 \cdot \text{EPR} \cdot \text{Mach} \cdot \text{Xalt} = 91.3$$

$$\text{EGT} = 37.16544 + 5.1897 \cdot \text{EPR}^3 - 0.4468\text{E-}03 \cdot \text{Xalt}^3 +$$
$$60.2309 \cdot \text{Mach}^2 + 45.7728 \cdot \text{Mach}^2 \cdot \text{EPR} - 0.7257 \cdot \text{Mach}^2 \cdot$$
$$\text{Xalt} + 0.0291 \cdot \text{Xalt}^2 \cdot \text{Mach} + 216.1152 \cdot \text{EPR} - 2.4248 \cdot$$
$$\text{Xalt} + 4.5583 \cdot \text{EPR} \cdot \text{Mach} - 1.1548 \cdot \text{EPR} \cdot \text{Xalt} - 0.6929 \cdot$$
$$\text{EPR} \cdot \text{Mach} \cdot \text{Xalt} = 467$$

Because the oil system of the engine 20 is operated at near constant values, the ideal oil system values used are the mid-range value for the normal operating range for each value. That is,

OILP=45.0

OILT=80.0

OILQ=1.15

If desired, the oil system may be modelled in the same manner as the rest of the engine system.

The differencing function subsection 51 is programmed to produce any one of a set of digital output signals 62-68 corresponding to the difference between the like set of actual digital output signals 23-29 and the set of ideal output signals 34-40. The scaling of these output signals 62-68 is such that normal: ±(0 to 10%)
caution: ±(10 to 15%), and
warning: ±(15 to 20%), limited to ±20%.

All values of differencing signals 62-68 are in percent (%). The differences for engine 20 are computed as follows:

For $N_1$, difference $N_1$ = actual $N_1$ − ideal $N_1$

For $N_2$, difference $N_2$ = actual $N_2$ − ideal $N_2$

For EGT, where 600° C. is considered maximum, difference EGT = (actual EGT − ideal EGT)/600 * 100.

For Fuel Flow, where 12000 lbs. per hour is considered maximum.

difference Fuel Flow = (actual fuel flow − ideal fuel flow)/ 12000 * 100.

For oil pressure, where the maximum is considered to be 100 psi, difference oil pressure = (actual oil pressure − ideal oil pressure)/ 100 * 100.

For oil temperature, where the maximum is considered to be 80° C., difference oil temperature = (actual oil temperature − ideal oil pressure)/ 180 * 100.

For oil quantity, where the output signal 40 is limited to a maximum of 1.3 gal, difference oil quantity = (actual oil quantity − ideal oil quantity)/ 1.5 * 100.

The caution/warning limits subsection 49 is programmed to generate any one of a set of limit digital output signals 52-58 corresponding to a like one of the first set of actual digital output signals 23-29 when the value of any one of the actual digital output signals 23-29 as in a caution or warning range of values. The corresponding one of any one of limited output signals 52-58 in a caution or warning range is scaled to match the corresponding one of the difference output signals 62-68 of the differencing function subsection 51, where difference output signals 62-68 of the differencing function subsection 51, where normal: ±(0 to 10%),
caution: ±(10 to 15%), and
warning: ±(15 to 20%), limited to ±20%.

All values of limit signals 52-58 are in percent (%).

For example, when $N_1$ has a normal range of 0% to 94%: a caution range from 94% to 100.1%, and a warning range of 100.1% or greater the following is used:

If $N_1$ is less than 89.0%, then

Caution_Warning_$N_1$=0.

If $N_1$ is equal to or greater than 89.0% but less than 94.0%, then $$\text{Caution\_Warning\_N}_1 = 2 * (N_1 - 89.0).$$

If $N_1$ is equal to or greater than 94.0% but less than 100.1%, then $$\text{Caution\_Warning\_N}_1 = 10 + 5 * (N_1 - 94.0)/(100.1 - 94.0).$$

If $N_1$ is equal to or greater than 100.1% but less than 115.0%, then $$\text{Caution\_Warning\_N}_1 = 15 + 5 * (N_1 - 100.1)/(115.0 - 100.1).$$

If $N_1$ is equal to or greater than 115.0%, then $$\text{Caution\_Warning\_N}_1 = 20.$$

For $N_2$, where
the normal region is 0% to 94%,
the caution region is from 94% to 100.0%,
and the warning region is 100.0% or greater, the following is used:
If $N_2$ is less than 89.0%, then $$\text{Caution\_Warning\_N}_2 = 0.$$

If $N_2$ is equal to or greater than 89.0% but less than 94.0%, then $$\text{Caution\_Warning\_N}_2 = 2 * (N_2 - 89.0).$$

If $N_2$ is equal to or greater than 94.0% but less than 100.00%, then $$\text{Caution\_Warning\_N}_2 = 10 + 5 * (N_2 - 94.0)/(100.0 - 94.0).$$

If $N_2$ is equal to or greater than 100.0% but less than 115.0%, then $$\text{Caution\_Warning\_N}_2 = 15 + 5 * (N_2 - 100.0)/(115.0 - 100.0).$$

If $N_2$ is equal to or greater than 115.0%, then Caution\_Warning\_$N_2$ = 20.
Fuel Flow has neither a caution nor a warning region. Therefore, $$\text{Caution\_Warning\_Fuel\_flow} = 0.$$

For EGT, where
the normal region is 0° C. to 535° C.,
the caution region is from 535° C. to 570° C.,
and the warning region is 570° C. or greater, the following is used:
If EGT is less than 500° C., then $$\text{Caution\_Warning\_EGT} = 0.$$

If EGT is equal to or greater than 500° C. but less than 535° C., then $$\text{Caution\_Warning\_EGT} = (\text{EGT} - 500) / 3.5$$

If EGT is equal to or greater than 535° C. but less than 570° C., then $$\text{Caution\_Warning\_EGT} = 10 + 5 * (\text{EGT} - 535)/(570 - 535).$$

If EGT is equal to or greater than 570° C. but less than 600° C., then $$\text{Caution\_Warning\_EGT} = 15 + 5 * (\text{EGT} - 570)/(600 - 570).$$

If EGT is equal to or greater than 600° C., then $$\text{Caution\_Warning\_EGT} = 20.$$

For oil pressure, when
the low warning is 35 psi or less,
the low caution is 35 to 40 psi,
the normal region is 40 to 55 psi,
and the upper warning region is 55 psi or greater, the following is used:
If oil pressure is less than 35 psi, then $$\text{Caution\_Warning\_Oil\_Pressure} = -15 - (35 - \text{oil\_pressure})/7.0.$$

If oil pressure is equal to or greater than 35 psi but less than 40 psi, then $$\text{Caution\_Warning\_Oil\_Pressure} = -10 - (40 - \text{oil pressure}).$$

If oil pressure is equal to or greater than 40 psi but less than 45 psi then $$\text{Caution\_Warning\_Oil\_Pressure} = 2 * (\text{oil\_pressure} - 45).$$

If oil pressure is equal to or greater than 45 psi but less than 55 psi, then $$\text{Caution\_Warning\_Oil\_Pressure} = (\text{oil\_pressure} - 45).$$

If oil pressure is equal to or greater than 55 psi but less than 70 psi, then $$\text{Caution\_Warning\_Oil\_Pressure} = 15 + (\text{oil\_pressure} - 55)/3.0.$$

If oil pressure is equal to or greater than 70 psi, then $$\text{Caution\_Warning\_Oil\_Pressure} = 20.$$

For oil temperature, where
the low warning is 40° C. or less,
the normal region is 40° to 120° C.,
the upper caution region is 120° to 157° C.,
and the upper warning region is 157° C. or greater, the following is used:
If oil temperature is less than 40° C., then $$\text{Caution\_Warning\_Oil\_Temperature} = -15 - (40 - \text{oil\_temperature})/8.$$

If oil temperature is equal to or greater than 40° C. but less than 120° C., then $$\text{Caution\_Warning\_Oil\_Temperature} = (\text{oil\_temperature} - 80)/4.$$

If oil temperature is equal to or greater than 120° C. but less than 157° C., then $$\text{Caution\_Warning\_Oil\_Temperature} = 10 + 5 * (\text{oil\_temperature} - 120/(157 - 120).$$

If oil temperature is equal to or greater than 157° C. but less than 180° C., then Caution_Warning_oil_temperature=15+5 * (oil temperature−151)/(180−157)

If oil temperature is equal to or greater than 180° C., then

Caution_Warning_Oil_Temperature=20.

For oil quantity, where the low warning is 1 gallon or less and the normal region is greater than 1 gallon, the following is used:
If oil quantity is less than 1 gallon, then Caution_Warning_Oil_Quantity=−15−5 * (1 −oil _quantity).

If oil quantity is equal to or greater than 1 gallon but less than 1.05 gallons, then Caution_Warning_Oil_Quantity=200 * (oil_quantity−1.05).

If oil quantity is equal to or greater than 1.05 gallons but less than 5 gallons, then Caution_Warning_Oil_Quantity=(10 / 3.95) * (oil_quantity−1.05).

If oil quantity is equal to or greater than 5 gallons, then

Caution_Warning_Oil_Quantity=10.

Worst case selector subsection 71 receives the difference output signals 62-68 and corresponding limit output signals 52-58 and selectively outputs the signal of each corresponding pair having the greatest absolute value as a set of output signals 72-78. This function takes as input a value for each engine parameter from both the Differencing Function (from the "ideal" functional and engine 20 model) and the caution/warning limits function.

For example, if the $|N_1|$ value of output signal 62 from the Differencing Function subsection 51 is greater or equal to the corresponding $|N_1|$. value (output signal 52) from the Caution/Warning Limits Function subsection 49, then the value of $N_1$ output signal 72 from the Worst Case Selector 71 is the $N_1$ value from the Differencing Function 51. Otherwise, the value of $N_1$ output signal (output signal 72) from the Worst Case Selector 49 is the value of output signal 52 $N_1$ from the Caution/Warning Limits Function 49.

Figure 2:
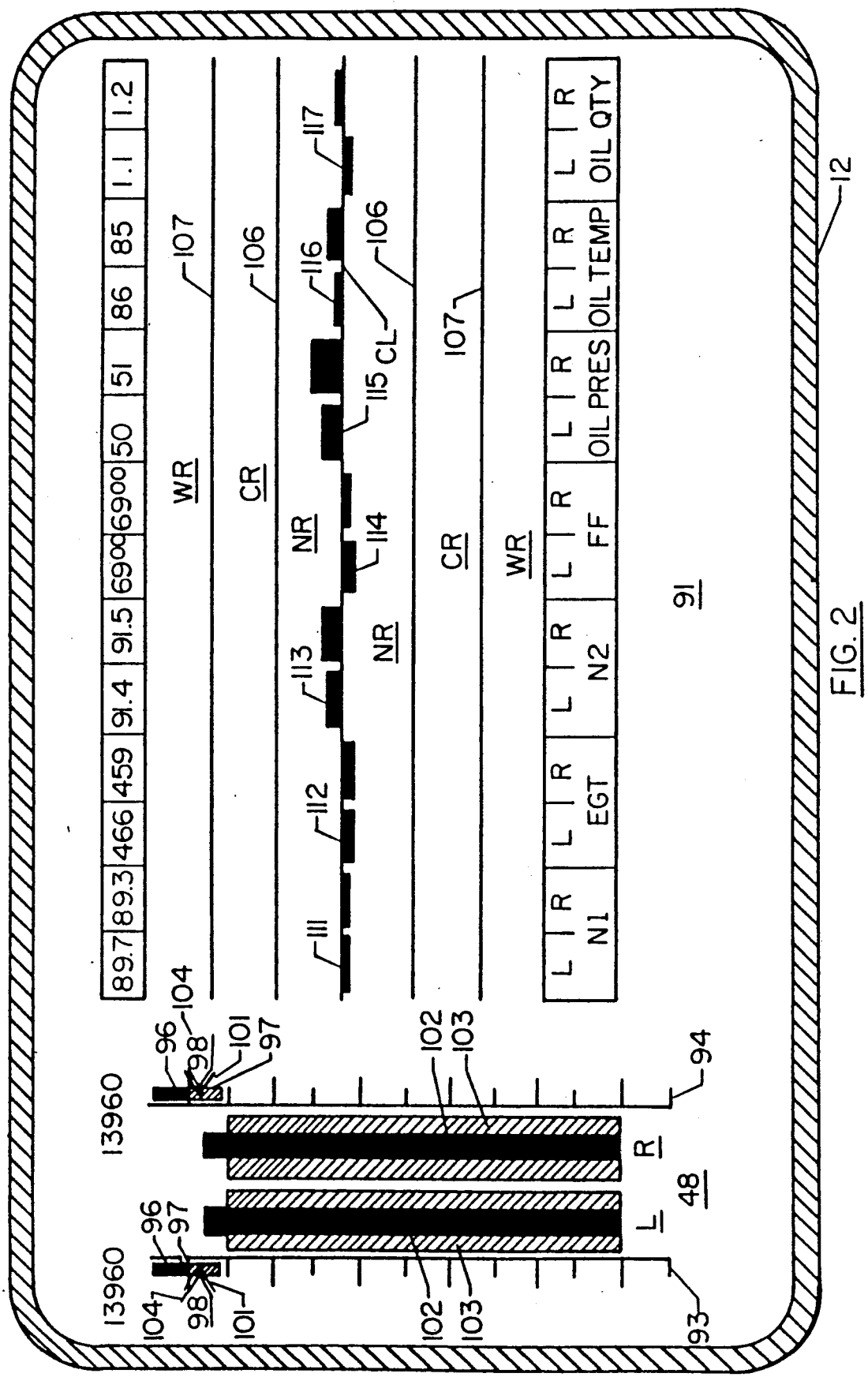
FIG. 2 illustrates the thrust indicator display and monitoring indicator display as shown in FIG. 1 in greater detail.
Figure 3:
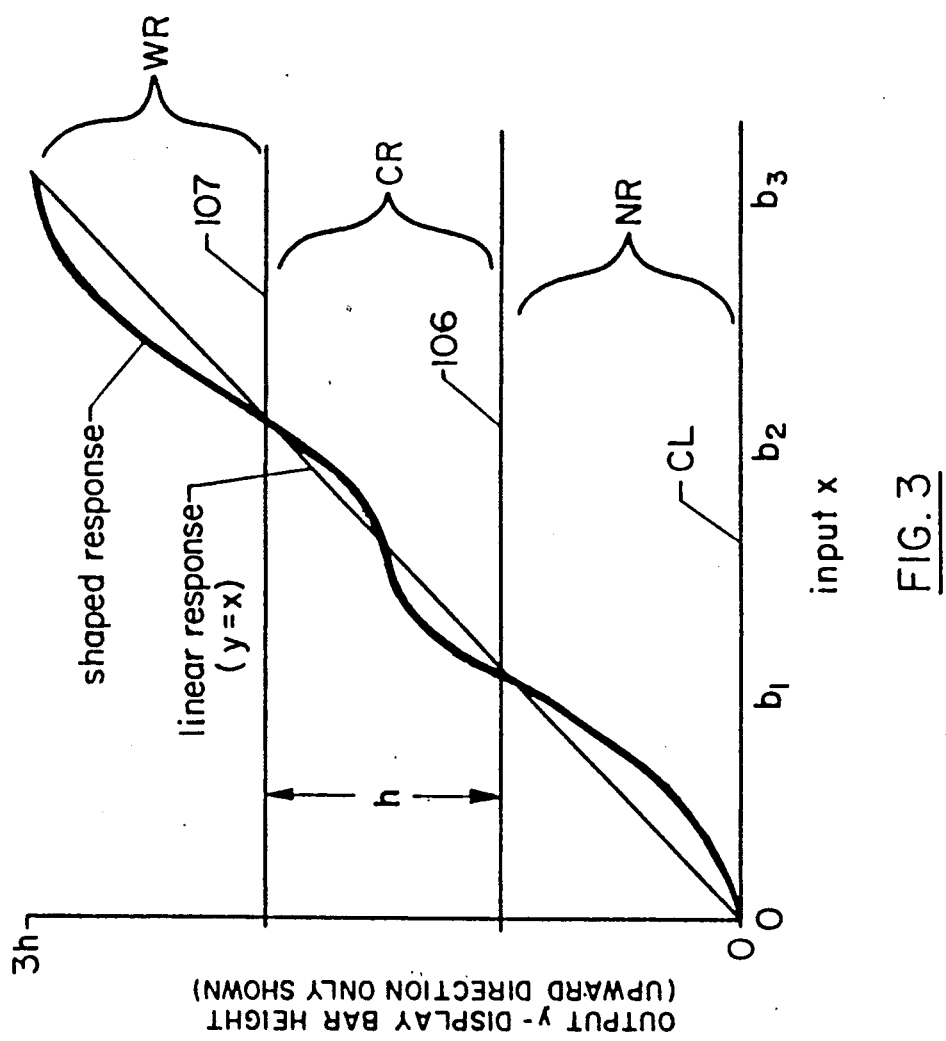
FIG. 3 is a diagram illustrating the manner in which noise or jitter is reduced in the monitoring indicator display by using a shaping function.

Shaping Function subsection 81 receives as input the output signals 72-78 from the Worst Case Selector Function 71. Referring to FIGS. 2 and 3, to obtain proper deviation bar sizes on the monitoring display 91, the Shaping Function subsection 81 uses the following values:

$3h$=the maximum height that the deviation bars 82B-88B bars can obtain, measured from the normal range line (at the center of the monitoring scale).

$2h = \frac{2}{3}$ the value of $3h$.
$h = \frac{1}{3}$ the value of $3h$.
$b_1 = 10\%$
$b_2 = 15\%$ -continued $b_3 = 20\%$ For the following inputs from the Worst Case Selector Function subsection 71, the following outputs are produced by the Shaping Function subsection 81:

| | |
|---|---|
| input = 0%, | output = 0% of $3h$. |
| input = $-b_1$, | output = $-33\frac{1}{3}\%$ of $3h$. |
| input = $-b_2$, | output = $-66\frac{2}{3}\%$ of $3h$. |
| input = $-b_3$, | output = $-100\%$ of $3h$. |
| input = $b_1$, | output = $33\frac{1}{3}\%$ of $3h$. |
| input = $b_2$, | output = $66\frac{2}{3}\%$ of $3h$. |
| input = $b_3$, | output = $100\%$ of $3h$. |

Continuing the description of display section 12, FIG. 2 illustrates both the thrust indicator 48 and monitoring indicator 91 in greater detail. The thrust indicator 48 provides aircraft control information directly to the pilot based upon the actual and ideal functional model performance parameters of two engines 20 designated as left (L) and (R) right respectively. The pilot may use this control information directly in making power adjustments without any additional "look-up" of engine performance data.

The monitoring indicator 91 simultaneously provides comparison information relative to determined limits of the actual and "ideal" engine performance parameters in both digital and graphic form. In addition the monitoring indicator 91 may provide an output signal 92 that preempts the thrust indicator 48 display when anyone of the monitored engine performance parameters exceeds a determined value as previously described as an added safety feature.

Thrust indicator 48 includes two vertical, horizontally spaced thrust scales 93 and 94 that represent the maximum available thrust from an "ideal" functional model of actual engines 20L and 20R respectively. The thrust scales 93 and 94 are scaled in percentage increments of 10 from −10 to 110 percent, the maximum available thrust of an "ideal" functional model of engines 20L and 20R. On each thrust scale 93 and 94, 100% equals the maximum available thrust without exceeding any one of the performance parameters of engines 20L and 20R which are predicted for the "ideal" functional model as previously explained. The actual available thrust valve is displayed digitally in pounds at the top of each scale thrust 93 and 94, in this instance 13,960 for both engines 20L and 20R as previously calculated.

Each thrust scale 93 and 94 includes a colored (red) range-thrust warning limit 96 that begins at the 100% mark and extends through 110% and a predicted, colored (yellow) range thrust caution limit 97 that begins for instance at 90% in this example and extends through 100%. The yellow range thrust caution limit 97 is based on a computed maximum continuous thrust obtained from the "ideal" functional model.

Under normal operating conditions, the system is arranged so that no other engine performance parameter ($N_1$, $N_2$, or EGT) will be within the yellow caution range 106 unless actual thrust value is in the yellow caution range 97. Also, under normal operations, no other engine parameter ($N_1$, $N_2$, or EGT) will be within the red warning range 107 unless the actual thrust value (output signal 45) for the respective engine 20L or 20R is in the red warning range 96.

A colored (yellow) thrust reference pointer 101 provided for each scale 93 and 94 that displays a reference value selected by the pilot for each engine 20L and 20R. This selected value, in percent of maximum available thrust, is presented in digital form (98% for example) at reference point 101 for a determined time interval (5 seconds for instance) following a change in the selected reference value.

The thrust indicator 48 also includes a colored (white) vertical thrust predictor bar 102 which overlays a current or actual thrust bar 103, both of which are positioned between and parallel to the respective scales 93 and 94. The thrust predictor bar 102 is responsive to and displays the calculated and pilot commanded thrust of the "ideal" functional model independent of the actual engines 20L and 20R but based on their then current operating conditions as determined by digital output signals 14, 16, 17, 18, and 21. The predicted commanded thrust is presented both as the colored (white) bar 102 and as a predictor pointer 104 that also includes a digital readout in the percent of maximum available thrust represented by the predicted thrust.

Each pair of actual thrust bars 103 is responsible to and displays the value of the actual thrust represented by a digital output signal 47 for the respective engine 20L or 20R with which associated. The actual thrust indicator bars 103 are multi-colored, reflecting their respective operating values by color-green when outside both the caution range 97 and warning range 96, of scales 93 and 94, yellow in the caution range 97 of the scales 93 and 94, and red in the warning range 96 of the scales 93 and 94. Under normal steady-state operating conditions the position, of the predictor bars 102 and actual thrust bars 103 relative to the respective scales 93 and 94 should be generally in agreement.

Referring to FIGS. 2 and 3, monitoring indicator 91 includes a plurality of side-by-side pairs of vertical bar deviation indicators 111-117 for the performance parameters $N_1$, EGT, $N_2$, fuel flow (FF), oil pressure, oil temperature, and oil quantity respectively for the engines 20L and 20R. Each bar indicator 111-117 displays the difference between the actual and estimated value of each performance parameter for each engine 20L and 20R as represented by the output signals 82-88 respectively from the shaping function subsection 81 as previously described. To reduce visual noise or jitter on the display 91 caused by the deviation bars 111-117 growing slightly around the O valve, a shaping function as shown in FIG. 3 is applied to the input deviation to the display. The shaping function diminishes this jitter around the O point, in the center of the caution range CR, and at the limit of the warning range WR. The shaping function also serves to increase the movement of the bars 111-117 around the transition areas between the normal and caution ranges NR and CR and between the caution and warning ranges CR and WR. This shaping function is expressed as follows:

$$\text{for } 0 \geq |X| \geq b_1: y = h\left(1 - \cos\left[\frac{\pi}{2}\left(\frac{X}{b_1}\right)\right]\right)$$

$$\text{for } b_1 > |X| > b_2: y = h + h\left(\frac{X - b_1}{b_2 - b_1}\right) +$$

-continued $$\frac{h}{8}\sin\left[2\pi\left(\frac{X - b_1}{b_2 - b_1}\right)\right]$$

$$\text{for } b_2 \geq |X|: y = 2h + h\sin\left[\frac{\pi}{2}\left(\frac{X - b_2}{b_3 - b_2}\right)\right]$$

The actual value of each performance parameter of each engine 20L and 20R is digitally displayed above each bar deviation indicator 111-117.

The face of the monitoring indicator 91 is also divided into normal, caution, and warning ranges (NR, CR, and WR respectively) both above and below a centerline CL that denotes the estimated or predicted value for each of the performance parameters of engines 20L and 20R as shown in FIG. 2. The normal ranges are demarked by the centerline CL which may be green in color and upper and lower range lines —106 and which may be yellow in color and demark the beginning of the yellow caution range CR, the limits of which are defined by spaced colored lines 107 (red) demarking the warning range WR. The green, yellow, and red range bars 103 of the thrust indicator 48 correspond to the like green, yellow, and red ranges NR, GR, and WR of the monitor indicator 91.

The normal, caution, and warning ranges associated with the respective engine performance parameters may be $-10\%$ to $10\%$; $-15\%$ to $-10\%$ and $10\%$ to $15\%$, and less than $-15\%$ and greater than $15\%$ respectively.

The limitations produced by the caution/warning limits subsection 49 are merged with the deviation values of subsection 51 by the worst case selector subsection 71 as each engine performance parameter approaches each limit. For example, the $N_1$ caution limit which begins at 94% is merged with the $N_1$ deviation value beginning at 89% $N_1$. This merging permits the corresponding $N_1$ deviation bar 111 to just begin transit coming into the yellow caution range CR as $N_1$ reaches 94%. To make the monitor indicator 91 even more quickly and accurately readable by a pilot, both the digital readout and deviation bar 111 are the same color as the associated range CR.

When the deviation of any one of the performance parameters of either engine 20L or 20R reaches the red warning range WR, this condition will be indicated by both a red deviation bar 111-117 and a corresponding red digital readout. A digital warning signal 92 input to the thrust indicator 48 actuates the coloring of bar 103 to red warning for the associated engine 20L or 20R preempting all other engine parameter indicators in the display 12.

To produce the actual display elements, as shown in FIG. 2 and which are generated by section 12, assume that the display is a conventional cathode ray tube having a face size that is 1000 units across and 575 units high and with the coordinate origin (x=0, y=0) in the lower left corner of the display face.

Given this, the following lines are drawn from X=265 to x=975:
The CL line, in color green, at Y=338.
The upper WR line 107, in color red, at Y=438.
The upper CR line 106, in color yellow, at Y=388.
The lower WR line 107, in color red, at Y=238.
The lower CR line 106, in color yellow, at Y=288.

It should be noted that the 3h value of FIG. 3 is equivalent to 150 units with the CL line at Y=338 units.

The monitoring vertical bar deviation indicators 111-117 are all centered at Y=338 units. The horizontal position of each of the centers of each of the plurality of side-by-side pairs of these vertical bar deviation indicators 111-117 are as follows:

111 left is at x=288, 111 right is at x=338
112 left is at x=390, 112 right is at x=440.
113 left is at x=492, 113 right is at x=542.
114 left is at x=594, 114 right is at x=644.
115 left is at x=696, 115 right is at x=746.
116 left is at x=798, 116 right is at x=848
117 left is at x=900, 117 right is at x=950.

The vertical size of each bar is obtained from the output of the shaping function subsection 81 such that:

$N_1$, 111, is 150 units * $N_1$ output, 82, /100.
EGT, 112, is 150 units * EGT output, 84, /100.
$N_2$, 113, is 150 units * $N_2$ output, 83, /100.
Fuel flow, 114, is 150 units * fuel flow output, 85 /100.
oil pressure, 115, is 150 units * oil pressure output, 86, §/100.
oil temperature, 116, is 150 units * oil temperature output, 87, /100.
oil quantity, 117, is 150 units * oil quantity output, 88, /100.

The width of each bar is 40 units.

The plurality of side-by-side pairs of actual value, digital readouts, shown above each corresponding pair of vertical bar deviation indicators 111-117 are placed vertically at 490 units. The displayed values are the corresponding values 23-29 from the engine 20. $N_1$, $N_2$, and oil quantity are displayed in 10ths. The remaining items are displayed at unity values.

The splines of the thrust scales 93 and 94 are drawn at x=66 and at x=182 units respectively. The lower end of each scale begins at Y=95 units and is 384 units high. The 0% point on each scale is at Y=127 units. The side-by-side pairs of maximum thrust available 50, digital readouts, shown above each corresponding pair of thrust scales 93 and 94 are placed vertically at 500 units.

The left and right red warning ranges 96 are displayed 2 units to the left and right of their respective scales 93 and 94. The warning ranges are each 5 units wide and are positioned vertically from Y=447 to Y=479 units. The left and right yellow caution ranges 97 are displayed 2 units to the left and right of their respective scales 93 and 94. The caution ranges are each 5 units wide and are positioned vertically from Y=447 units down to the position obtained from the caution limit mark output 46.

The pair of actual thrust bars 103 for scales 93 and 94 are centered at x=95 and at x=153 units respectively. The lower end of each bar begins at Y=127 units. The relative height of each bar is computed as follows:

height=320 units * normalize actual thrust (47)/100. The width of each bar is 50 units. The bar is normally green in color. If the height of the bar is within the caution range mark, the bar color is yellow. If the height of the bar is within the warning range mark, the bar color is red. If output signal 92 from the monitor is on, the color of the bar is red.

The pair of predicted thrust bars 102 for scales 93 and 94 are centered at x=95 and at x=153 units respectively. The lower end of each bar begins at Y=127 units. The relative height of each bar is computed as follows:

height=320 units * normalize predicted thrust (59)/100. The width of each bar is 20 units. The predictor pointer 104 is also positioned at this height. The digital value displayed as part of the predictor pointer 104 is the predicted thrust value 59 expressed in percent. The bar and pointer are white in color. In addition to the predicted thrust pointers, reference pointers 101 may be displayed. These pointers are yellow in color and may be set anywhere vertically along the thrust scales 93 and 94 respectively. The position is set directly by the pilot.

The invention thus continuously and simultaneously displays to a pilot the maximum amount of thrust or power an engine or engines can produce under the current operating conditions, the amount of thrust commanded; and the actual thrust the engine or engines are producing. Additionally, all normal engine thrust limiting parameters ($N_1$, EGT, and $N_2$) are continuously and simultaneously used to compute the thrust range markings displayed on thrust indicator 48, eliminating the need for cross-checking other engine settings when setting engine thrust or power.

The display of the predicted thrust of an "ideal" engine under the current operating conditions is independent of and permits a direct comparison check between the performance of the operating engine 20 or engines 20L and 20R and the "ideal" or functional model. Thus, the invention determines what the thrust performance parameters of an "ideal" functional model engine should be and compares them simultaneously and continuously against the corresponding actual engine thrust performance parameters.

Under normal operating conditions, the differences between the actual and "ideal" engine performance parameters are continuously and simultaneously displayed by deviation bars 111-117 in the monitor indicator 91. Under near-critical operating conditions, critical limits are factored into the displayed information providing a pilot with the most severe indications whether it is an operating limit or an off-ideal operating condition.

Presenting this information in the form of the column-deviation bars 111-117 permits holistic viewing as the time required to acquire the displayed engine performance parameters is constant relative to the number of displayed engine performance parameters. That is, it requires no more time to process and visually display one set of engine performance parameters than two in accordance with the invention. Thus, the method and systems in accordance with the invention becomes more effective as either the number of engines or engine performance parameters for each engine increases.

By providing a fixed position on the thrust scales 93 and 94 for the maximum available thrust which is computed from the "ideal" engine as explained, a pilot is provided with a fixed, visual reference location thereby reducing visual scan time. Also, by normalizing the thrust (digital output signal 60) with the actual maximum thrust available (digital output signal 50) at current engine operating conditions, the customary use of take off power setting charts is no longer required. The predicted thrust (digital output signal 59) simultaneously provides the pilot an independent visual check between commanded thrust (throttle position) and the actual engine thrust.

By using a simplified, functional model of the monitored engines 20L and 20R, a pilot may compare visually and simultaneously the displayed operational performance of the monitored engines and their respective engine performance parameters. This comparative data provides a means for a pilot to identify degraded or degrading operational conditions. Thus, the thrust and monitor indicators 48 and 91 respectively allow the pilot to determine the status of all engine performance parameters at a single glance and to directly control engine thrust based on the displayed information thereby reducing pilot work load with increased operational safety.

While preferred embodiments of the invention have been described in detail, numerous revisions and modifications can be made within the principles of the invention which is limited only by the appended claims.

What is claimed is:

1. A method of monitoring and displaying the actual, predicted, and available thrust of an aircraft engine under determined operating conditions comprising the steps of:
   calculating the actual thrust of said aircraft engine under said determined operating conditions and generating an output signal representative thereof:
   calculating the predicted thrust of a functional model of said aircraft engine under said determined operating conditions and generating an output signal representative thereof:
   calculating the available thrust of said functional model of said aircraft engine under said determined operating conditions: and
   simultaneously displaying the representative values of said actual, predicted, and available thrusts.

2. The invention as defined in claim 1 wherein said actual, predicted, and available thrusts are displayed in digital and graphic form.

3. The invention as defined in claim 2 wherein the value of said actual thrust is displayed in different colors representing determined value ranges.

4. The method of claim 1 including the steps of:
   generating a first set of digital output signals representative of one or more performance parameters of said aircraft engine under said determined operating conditions;
   calculating the value of one or more performance parameters of said functional model of said aircraft under said determined operating conditions and corresponding to the performance parameters of said aircraft engine;
   generating a second set of output signals representative of the values of said performance parameters of said function model; and
   simultaneously displaying the values of said first and second sets of output signals.

5. The method of claim 4 wherein the values of said first set of output signals are displayed digitally and the values of said second set of output signal are displayed graphically in different colors representing determined value ranges.

6. The method of claim 5 wherein the colored value ranges of the actual thrust and said second set of output signal are identical.

7. A method of monitoring and displaying one or more selected performance parameters of an aircraft engine comprising the steps of:
   sensing the value of said one or more selected performance parameters of said aircraft engine under determined operating conditions:
   generating a first set of actual value output signals representative of the actual value of each of said one or more selected performance parameters;
   predicting the value of corresponding performance parameters of an "ideal" functional model of each of said one or more performance parameters of said aircraft engine under said determined operating conditions:
   generating a second set of predicted value output signals representative of the predicted value of each of said one or more of said corresponding performance parameters of said functional model:
   comparing said first and second sets of output signals and generating a third set of difference value output signals represented of the difference in values between said first and second sets of output signals; and
   simultaneously displaying the actual value of each of said one or more actual engine performance parameters as represented by said first set of actual output signals and the difference value between each of said one or more actual and corresponding predicted performance parameters as represented by said third set of difference value output signals.

8. The method of claim 7 wherein said determined operating conditions include air temperature, air pressure, mach, and bleed valve position.

9. The method of claim 8 wherein each of said performance parameters of said functional model equal and are of the following form:

$$A_0 + A_1 X^3 + A_2 Y^3 + A_3 Z^3 + A_4 X^2 Y + A_5 Y^2 Z + A_6 Z^2 + A_7 Y + A_8 XZ + A_9 XYZ.$$

10. The method of claim 7, wherein said one or more actual and functional model's ideal engine performance parameters include:
    low pressure compressor rotational speed ($N_1$), high pressure compressor rotational speed ($N_2$), exhaust gas temperature (EGT), fuel flow (FF), oil pressure; oil temperature; and oil quantity.

11. The method of claim 7 including the step of visually displaying when any one of said output signals in said first set of output signals exceeds the limits of a determined value range.

12. The method as defined in claim 7 including the step of visually displaying when any one of said signals in said third set of difference output signals exceeds the limits of any one of one or more determined value ranges.

13. The method of claim 12 including the step of establishing normal, caution, and warning ranges having determined value limits for each of said signals in said third set of output signals.

14. The method of claim 13 including the step of applying a shaping function to said output signals in said third set of output signals as each approaches a determined value of 0, $b_1$, or $b_2$ at the beginning of each of said normal, caution, and warning difference value ranges respectively, said shaping function at each of said difference values 0, $b_1$, and $b_2$ being derived as follows:

$$\text{for } 0 \geq |X| \geq b_1: y = h\left(1 - \cos\left[\frac{\pi}{2}\left(\frac{X}{b_1}\right)\right]\right)$$

-continued $$\text{for } b_1 > |X| > b_2: y = h + h\left(\frac{X - b_1}{b_2 - b_1}\right) +$$

$$\frac{h}{8} \sin\left[2\pi\left(\frac{X - b_1}{b_2 - b_1}\right)\right]$$

$$\text{for } b_2 \geq |X| > : y = 2h + h \sin\left[\frac{\pi}{2}\left(\frac{X - b_2}{b_3 - b_2}\right)\right]$$

15. In a system for monitoring and displaying one or more actual performance parameters of a jet aircraft engine under determined operating conditions the improvement comprising:
   first means for generating a first group of a plurality of output signals including a first set of output signals representative of the value of said one or more actual performance parameters of said engine under said determined operating conditions:
   computer means for predicting the value of one or more performance parameters of an "ideal" functional model of said jet aircraft engine using said determined operating conditions, said predicted performance parameters corresponding to said one or more actual performance parameters of said aircraft engine:
   said computer means further including second means for generating a second group of a plurality of output signals including a second set of output signals representative of the value of said one or more predicted performance parameters of said functional models: and
   a display panel, including a monitoring indicator display means for simultaneously displaying said one or more output signals in said first set of output signals.

16. The invention as defined in claim 15 including means for generating a third set of difference value output signals representative of the differences between corresponding ones of said one or more output signals in said first and second sets of output signals: and
   monitoring indicator means including means for simultaneously displaying the value of each of said output signals in said third set of difference value output signals.

17. The invention of claim 15 wherein said determined operating conditions include output signals representative of actual air temperature, air pressure, mach, and bleed valve position.

18. The invention as defined in claim 17 wherein the performance parameters of said functional model equal and are of the following form:

$$A_0 + A_1X^3 + A_2Y^3 + A_3Z^3 + A_4X^2Y + A_5Y^2Z + A_6Z^2 + A_7Y + A_8XZ + A_9XYZ$$

19. The invention as defined in claim 18 wherein said predicted performance parameters of said jet engine represented by said second set of predicted value output signals include low pressure compressor rotational speed ($N_1$), high pressure compressor rotational speed ($N_2$), exhaust gas temperature (EGT), fuel flow (FF), oil pressure, oil temperature, and oil quantity.

20. The invention as defined in claim 16 including means wherein the value of each of said output signals in said first set of actual value output signals is digitally displayed and the value of each of said output signals in said third set of difference value output signals are displayed graphically as a bar deviation.

21. The invention of claim 16 including warning limit means for determining when any one of said first set of actual value output signals exceeds a determined warning limit value: and
   means on said monitoring display indicator for indicating when such condition occurs.

22. The invention as defined in claim 4 wherein said first group of output signals includes an EPR output signal representative of the engine pressure ratio of said jet engine under said determined operating conditions and said second means includes means responsive to said determined operating conditions and said EPR output signal for calculating the actual thrust of said aircraft engine and generating an output signal representative thereof;
   a display panel; and
   thrust indicator display means for directly displaying the value of said calculated actual thrust on said display panel.

23. The invention as defined in claim 22 wherein said computer means includes means responsive to said determined aircraft operating conditions for calculating and generating output signals representative of the values oF the predicted and available thrusts of said functional model of said aircraft when operated under said determined operating conditions: and
   thrust indicator display means for directly displaying the value of said respective available, predicted, and actual thrusts.

24. The invention as defined in claim 23 wherein said respective display means include a common display panel and said values of said actual, predicted, and available thrusts are simultaneously displayed.

25. The invention as defined in claim 24 including circuit means interconnecting said monitoring indicator means and said thrust indicator means for displaying on said thrust indicator means when any one of said actual engine performance parameters as represented by any one of said one or more output signals in said first set of output signals exceeds a determined value.

26. A system for monitoring and displaying the actual, predicted and available thrust of a jet aircraft engine under determined operating conditions comprising
   a first computer means responsive to said determined operating conditions for calculating the actual thrust of said aircraft engine based on said determined conditions and generating an actual thrust output signal representative thereof;
   said computer means including a second computer means responsive to said determined operating conditions for calculating the predicted and available thrust of a functional model of said aircraft engine under said determined operating conditions and generating signals representative of the values of said predicted and available thrusts: and
   thrust indicator display means for simultaneously displaying the values of said actual, predicted, and available thrusts.

27. The system as defined in claim 26 including means for displaying the respective thrust values digitally and graphically.

* * * * *